Feb. 16, 1943. W. F. COLEMAN 2,311,618
BUTTER SLICING AND DISPENSING MACHINE
Filed Sept. 30, 1939 3 Sheets-Sheet 1
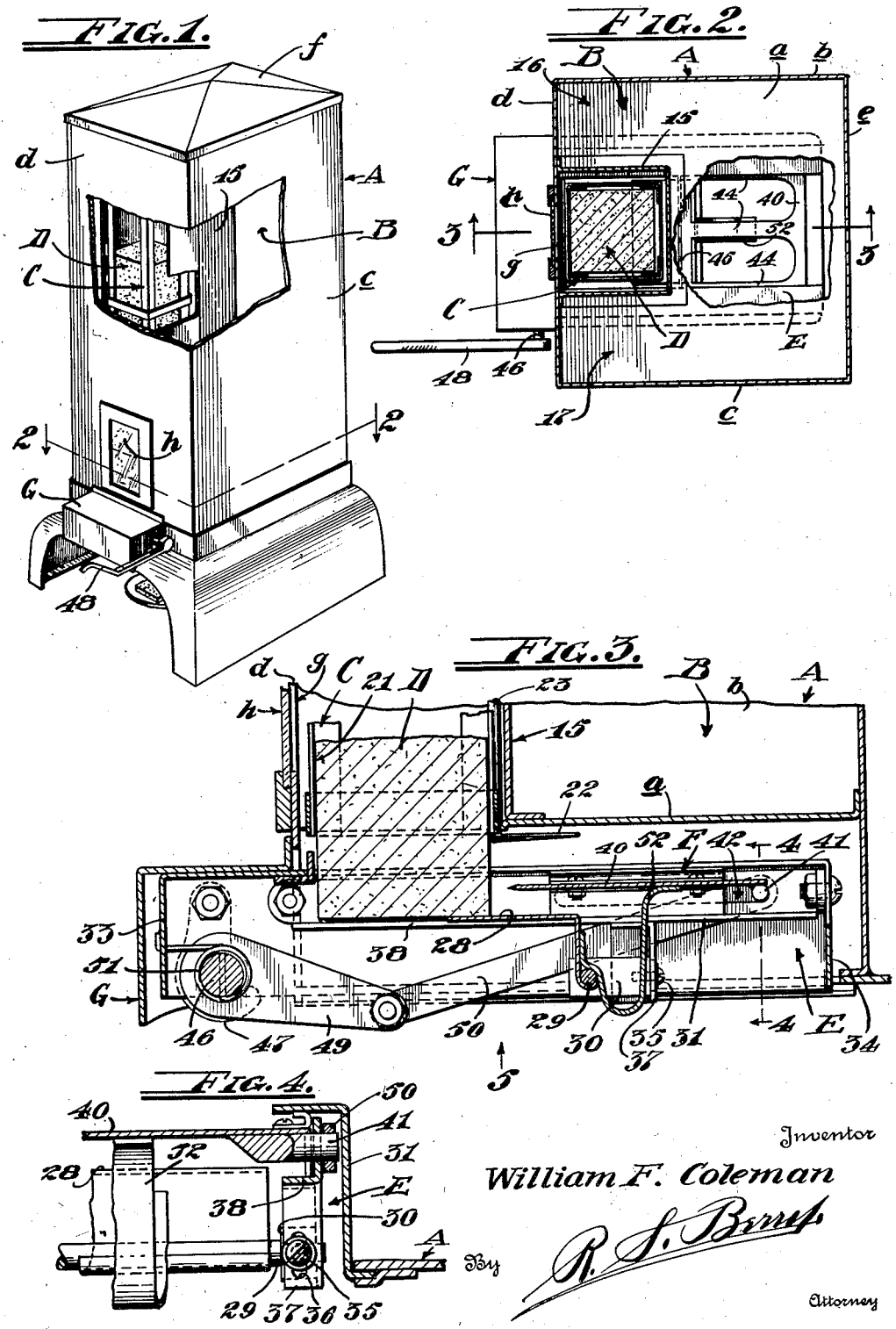
Inventor
William F. Coleman
By R. S. Berry
Attorney

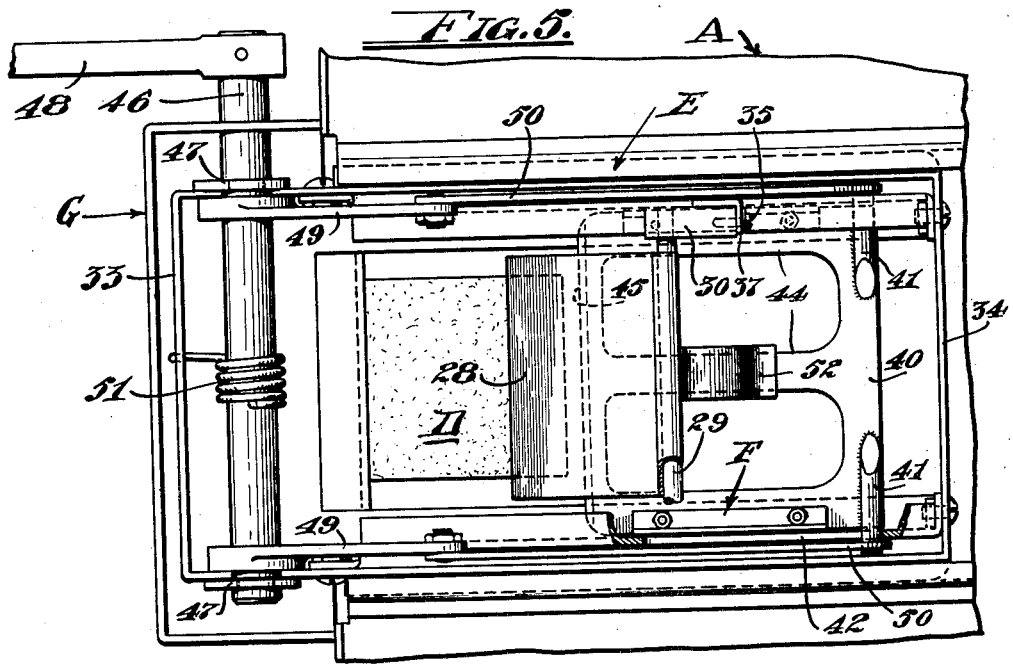
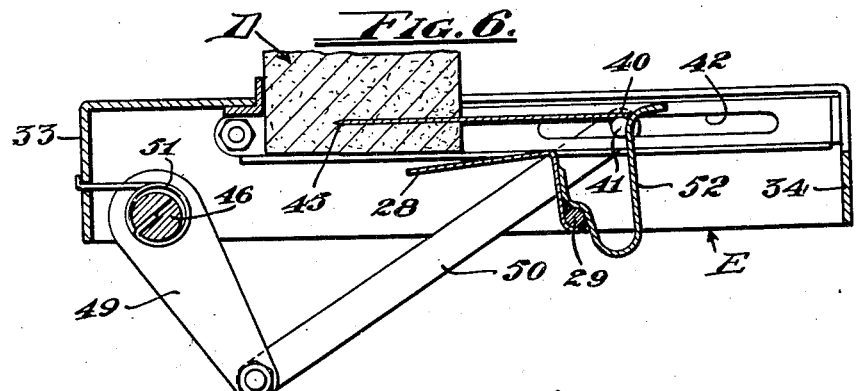
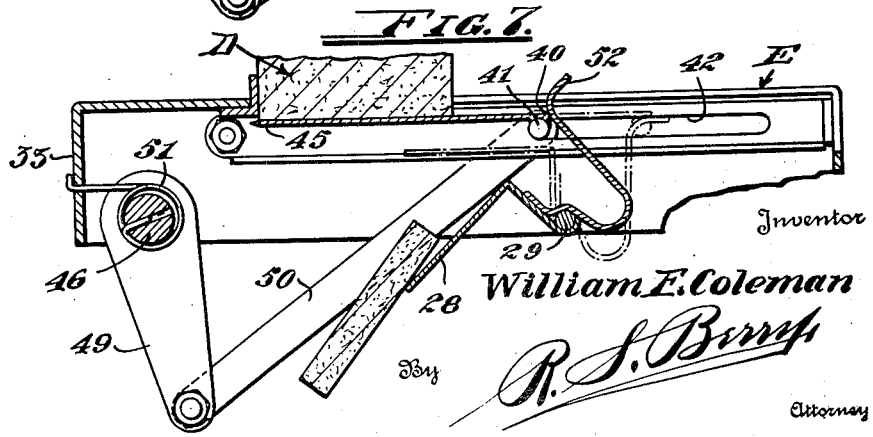

Feb. 16, 1943. W. F. COLEMAN 2,311,618
BUTTER SLICING AND DISPENSING MACHINE
Filed Sept. 30, 1939 3 Sheets-Sheet 3

Inventor
William F. Coleman
By R. S. Berry
Attorney

Patented Feb. 16, 1943

2,311,618

UNITED STATES PATENT OFFICE 2,311,618

BUTTER SLICING AND DISPENSING MACHINE

William F. Coleman, Richmond, Calif.; Hilma Coleman executrix of said William F. Coleman, deceased Application September 30, 1939, Serial No. 297,309

3 Claims. (Cl. 31—21)

This invention relates to a machine for cutting and dispensing butter, and more particularly pertains to a mechanism for forming butter chips such as are served to diners in eating establishments.

An object of the invention is to provide a machine of the above character which is manually operable to cut and dispense butter chips, one at a time, and which may be manipulated by an operator to effect formation and dispensing of butter chips as they are to be served and without contact of the butter chips with the hands.

Another object is to provide a butter chip forming machine in which may be positioned a butter containing magazine preparatory to delivery of the butter from the magazine into a position to be acted on by a slicer, and in which the slicer is so constructed and arranged as to be actuated by an operator to slice a butter chip from a block of butter fed from the magazine.

Another object is to provide a butter chip dispenser in which the chips are formed as dispensed and in which the butter contained in the magazine may be maintained in a properly refrigerated position.

A further object is to provide a butter chip forming and dispensing mechanism in which butter chips may be readily severed from a block of butter and dispensed in a fashion that will minimize breaking of the butter chips during the cutting and dispensing thereof and also minimize possibility of a severed butter chip becoming lodged in the dispenser and thereby interfering with the operation of the machine.

Another object is to provide a machine of the above type embodying a construction adapted for the employment of a series of the butter magazines and whereby a block of butter may be fed to the slicer from any one of a number of magazines and which will permit of loading of the machine with a plurality of filled magazines and the replacement of one or more of emptied magazines at the convenience of the operator to insure the maintenance of a supply of butter in the machine.

A further object is to provide a butter chip forming and dispensing machine in which the operating parts as well as the butter magazine may be easily removed and replaced and whereby ready access may be had to the various parts of the machine for effecting cleansing thereof and in making repairs and adjustments.

With the foregoing objects in view, together with such other objects and advantages as may subsequently appear, the invention is carried into effect as illustrated in the accompanying drawings, in which:

Fig. 1 is a perspective view of the machine with portions broken away and parts removed to show the interior of the butter receptacle and refrigerant chamber;

Fig. 2 is a horizontal section taken on the line 2—2 of Fig. 1;

Fig. 3 is a detail in vertical section taken on the line 3—3 of Fig. 2;

Fig. 4 is a detail in cross section taken on the line 4—4 of Fig. 3 as seen in the direction indicated by the arrows;

Fig. 5 is an inverted plan view as seen in the direction indicated by the arrow 5 in Fig. 3;

Figs. 6 and 7 are details in section similar to that of Fig. 3, showing in conjunction with the latter the mode of operation of the butter chip forming and dispensing mechanism;

Figure 8:
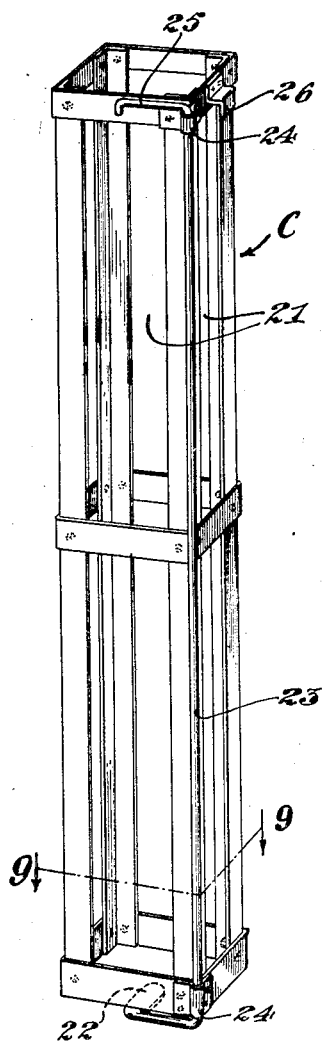
Fig. 8 is a perspective view of the butter magazine.

Referring to the drawings more specifically, A indicates generally a housing which as shown in Fig. 1 is box-like in form and is open at its upper end; the housing including a bottom wall $a$, side walls $b$ and $c$, front and back walls $d$ and $e$. The housing also includes a removable cover $f$ formed to seat on the upper margins of the front, back, and side walls to afford a closure for the housing.

The housing A encloses a refrigerating chamber B which is designed to contain a suitable refrigerating medium such as ice.

The front wall $d$ of the housing is formed with an opening $g$ which is covered by a transparent plate $h$, preferably formed of glass, and arranged interiorly of the housing adjacent the plate $h$ is a vertically extending tubular guideway 15 which opens at its lower end through the bottom wall $a$ and terminates at its upper end on a plane with the top margins of the housing side walls. The guideway is here shown as formed of sheet metal and of rectangular cross section with its forward portion open to expose its interior through the opening g. The side walls of the guideway 15 are spaced from the side walls b and c to provide channels 16 and 17 which open to the refrigerant chamber B. The channels 16 and 17 are closed at their forward ends by the wall d to which are joined the forward edges of the adjacent side walls of the guideways as particularly shown in Fig. 2, and the lower ends of the channels 16 and 17 are closed by the bottom wall a of the housing A.

The channels 16 and 17 are provided to receive a refrigerant, such as ice water, or brine, or crushed ice, from the container B along the sides of the guideways.

The walls of the housing A may be insulated in any suitable conventional fashion not necessary to be here shown.

The guideway 15 is open at its upper end to receive and support a butter magazine C made up of elongated tubes of rectangular cross section having sight openings 21 formed in the side walls thereof; each tube of the magazine C being designed to loosely receive a block of butter D of rectangular cross section of a dimension corresponding to that of the usual butter chip. The butter block D may be of any suitable length but is preferably formed of a length substantially conforming to the length of the magazine C so as to at least approximately fill the latter.

The block of butter D is designed to advance to discharge from the lower end of the magazine C and guideway 15 under its own weight, and accordingly means are provided for releasably holding the butter block within the magazine until such time as its downward movement is desired. The butter block D is temporarily supported in the magazine by means of a finger 22 mounted for horizontal swinging movement at the lower end of the magazine on a turnable rod 23, as particularly shown in Figs. 8 and 9; the rod 23 extending along one corner of the magazine and journalled in bearings 24 at the ends of the latter, and having a handle 25 at its upper end whereby the finger 22 may be shifted laterally from beneath a block of butter supported thereon. A hook 26 is fixed on the upper end of the magazine for engaging the upper end of the guideway to support the magazine in the latter.

Extending beneath the guideway is a horizontally extending tiltable plate 28, the forward edge of which projects beneath the rear portion of the open lower end of the gguideway 15 and the rear portion of which is carried on a rock shaft 29 arranged rearward of the plane of the vertical back wall of the guideway; the rock shaft 29 being normally held against rotation but being operable in a fashion to releasably hold the plate 28 in its horizontal position, as will presently be described. The plate 28 serves as a means for supporting the block of butter extending downwardly from a magazine C from which the butter is being dispensed.

The rock shaft 29 is journalled in bearings 30 carried on the side members 31 of a frame E supported on the housing A and arranged beneath the bottom wall a of the latter. The side members 31 of the frame are connected together at their ends by end members 33 and 34.

The bearings 30 are supported for vertical adjustment to vary the spacing of the plate 28 relative to the lower end of the butter magazines and for which purpose are mounted on screws 35 threaded in the bearings and extending through slots 36 in brackets 37 depending from the under side of horizontal guideways 38 on the side members 31 of the frame E as particularly shown in Fig. 4; the screws 35 being operable to effect vertical adjustment of the bearings 30, shaft 29, and plate 28.

Arranged above the plate 28 is a carriage F embodying a slide bar 40 fitted with slides 41 supported in slots 42 formed in the frame members 31, as particularly shown in Figs. 3 and 4.

Projecting forwardly from the bar 40 is a series of brackets 44 on the outer ends of which is carried a blade 45 constituting a cutter, and which blade extends on a horizontal plane spaced above the plane of the top face of the plate 28 below the under side of the finger 22; being spaced a distance from the plate 28 corresponding to the thickness of the butter chips to be formed and which thickness may be varied by adjusting the plate 28 vertically through the medium of the adjustment screws 35. The cutting edge of the blade 45 is arranged on a vertical plane rearward of the plane of the back wall of the guideway 15 when the carriage F is in its retracted position.

Means are provided for advancing the carriage F to move the blade 45 forwardly through a block of butter carried on the plate 28, which means is here shown as embodying a rock shaft 46 journalled in bearings 47 in side members of the frame E. One end of the shaft 46 extends outwardly beyond one side wall of a housing G on the lower front portion of the housing A and is fitted with an operating lever 48. Affixed to the shaft 46 are downwardly and rearwardly extending arms 49 connecting with links 50 pivotally attached to the sides of the carriage F by pivotal connection with the slides 41. Encircling the shaft 46 is a coil spring 51 one end of which connects with the shaft and the other end of which connects with the forward member 33 of the frame E and which spring acts normally to position the rock shaft 46 with the hand lever 48 elevated and with the arms 49 and links 50 arranged to dispose the carriage F in a retracted position as shown in Fig. 3; the rear ends of the slots 42 forming stops for the slides 41 to limit the rearward movement of the carriage F.

Connecting with the rock shaft 29 is an upwardly and rearwardly extending finger 52 the upper end of which is arranged to abut the under side of the center brackets 44 of the carriage F when the latter is in its retracted position and whereby the plate 28 is disposed and supported in its normal horizontal position, but which finger 52 is adapted on advance of the carriage F to be cleared by and then follow the bar 40 on the latter to permit downward rocking movement of the plate 28.

Figure 9:
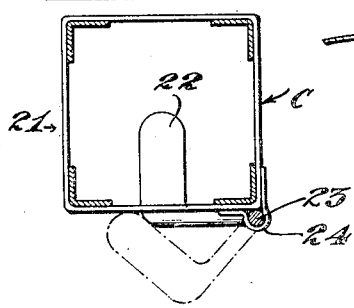
Fig. 9 is a horizontal section taken as indicated by the line 9—9 of Fig. 8.

In the operation of the invention as above described, a magazine C containing a block of butter D is positioned in the guideway 15 and supported thereon by the hook 26 on the upper end of the magazine engaging the upper margin of the guideway; the block of butter being supported in the magazine by the finger 22 projecting therebeneath and which finger is moved from under the lower end of the butter block by turning the rod 23 by manipulation of the lever 25, as indicated in dotted lines in Fig. 9. The butter block then moves downward until the rear marginal portion of its lower end comes to rest on the forward marginal portion of the plate 28 as shown in Fig. 3.

When it is desired to form a butter chip the operator actuates the crank 48 to rock the shaft 46 which acts through the arms 49 and links 50 to advance the carriage F in opposition to the spring 51. Initial forward movement of the carriage F advances the blade 45 into the block of butter as shown in Fig. 6. As the blade enters the butter block the finger 52 rides rearward of the bar 49 of the carriage so as to free the plate 28 and allow the latter to swing downwardly slightly as the plate progresses through the butter block as indicated in Fig. 6.

Continued forward movement of the carriage F causes the bar 49 to advance clear of the upper end of the finger 52 so as to permit the plate 28 to tilt downwardly to an intermediate position while the cutter blade is advancing through the butter block.

On the carriage F being advanced to its forwardmost position in which the cutter blade will have passed completely through the butter block, the plate 28 will be tilted to a depending position, as shown in Fig. 7, thus allowing the severed chip of butter previously deposited thereon to fall into a receptacle placed beneath the machine for its reception. The butter block will then be carried entirely on the cutter blade 45 extending therebeneath.

On reverse movement or release of the operating lever 43, the carriage F will move rearwardly under the urge of the spring 51, thus restoring the butter supporting plate 28 to its elevated horizontal position through the action of the bar 49 on the finger 52, which position is assumed before the blade moves clear of the supported butter block so that the butter block will move downwardly onto the plate 28 as the carriage F moves to its rearmost position. In this fashion repeated operations reduce the butter block to chips one at a time.

The empty magazine may be refilled and replaced at the convenience of the operator.

Figure 10:
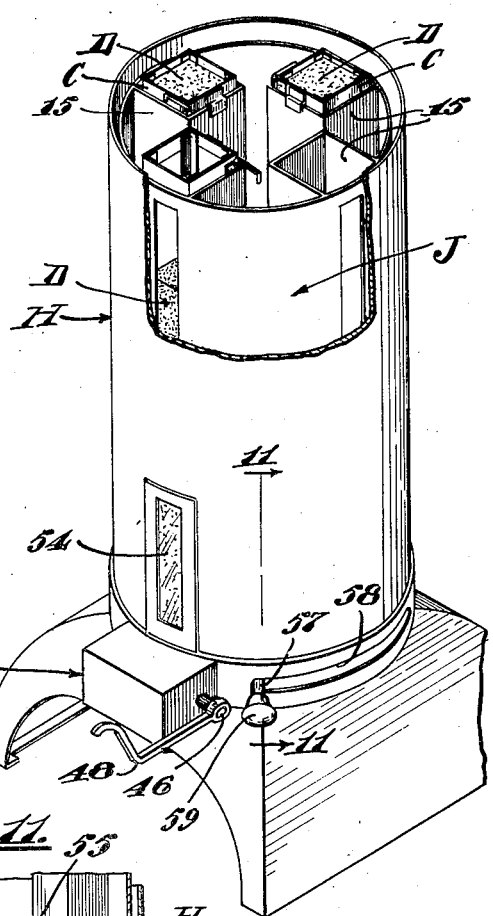
Fig. 10 is a perspective view, with portions broken away, depicting a modified form of the invention in which a plurality of butter magazines are employed and adapted to be successively positioned to deliver the butter contents thereof to the butter chip forming and dispensing mechanism.
Figure 11:
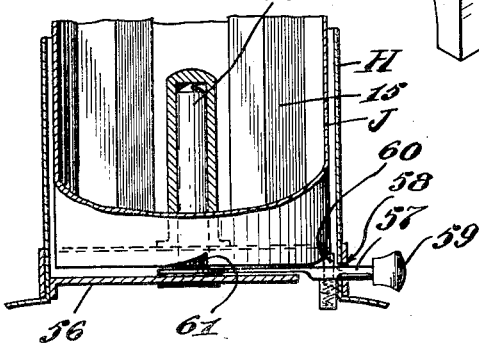
Fig. 11 is a detail in section and elevation taken on the line 11—11 of Fig. 10 showing the manner of mounting and operating the butter magazine.

While the invention has been above set forth as applied to a single magazine machine, it is equally applicable to a multiple magazine machine as illustrated for example in Figs. 10 and 11, in which H indicates a cylindrical casing fitted with a sight opening 54 and in which casing is revolubly mounted a hollow cylindrical refrigerating housing J fitted with a series of guideways 15 each of which is adapted to receive one of the butter magazines C.

The housing J is revolubly mounted on an upright pivot pin 55 carried on a bracket 56 projecting inwardly from the lower end portion of the casing H as shown in Fig. 11. An arm 57 pivoted on the pin 55 extends outwardly beneath the housing J and projects through a slot 58 in the casing H which arm is fitted with a handle 59 by which it may be swung laterally a distance which is determined by the length of the slot 58 and which in turn is in accordance with the distance between the radial centers of the guideways 15 and the outer periphery of the cylindrical housing J.

Mounted on the arm 57 is a spring pressed latch 60 which is engageable with notches 61 formed on the lower margin of the housing J with adjacent notches spaced apart a distance corresponding to the spacing of the radial centers of the guideways 15 and the periphery of the housing J whereby on swinging the arm 57 back and forth between the ends of slot 58 the latch 60 will ride out of a ratchet notch 61 when the arm is moved in one direction and into engagement with the shoulder of an adjacent notch 61 so that on swinging the arm 57 in the opposite direction the housing J will be turned a quarter of a revolution. By this arrangement the several guideways 15 with their associated butter magazines may be moved successively to dispose the lower end of the magazine in a guideway 15 in operative relation to the butter cutting and dispensing mechanism controlled by the lever 43 previously described and which is arranged beneath the housing J in the manner previously described with reference to the single magazine construction shown in Fig. 1 and which accordingly will be understood and will require no repetition here.

The several guideways 15 in the construction shown in Fig. 10 are spaced apart in the refrigerant chamber so as to afford space in the latter on three sides of the guideways as in the refrigerant chamber B shown in Fig. 2 whereby the refrigerant, such as cracked ice, will lie against three sides of the guideway and thereby effect chilling action on the butter block contained in the magazine from three sides of the block and thus maintain the butter in a properly chilled condition to enable it being cut into butter chips without adherence of the butter to the parts of the machine contacted thereby.

While I have shown and described a specific embodiment of my invention, I do not limit myself to the exact details in construction and arrangement shown, but may employ such changes in the construction and arrangement of the parts as occasion may require coming with the meaning and scope of the appended claims.

I claim:

1. In a butter slicing and dispensing machine, a plate tiltable on a horizontal axis at one end thereof, means for delivering a block of butter downwardly to said plate, a horizontally reciprocal carriage, a cutter on said carriage arranged to sever a block of butter supported on said plate on advance of said carriage, manually operable means for advancing said carriage, and a finger connected to the other end of said tiltable plate bearing on the under side of said carriage and arranged to be cleared on advance of said carriage; said plate being adapted to swing downwardly when said carriage clears said finger.

2. In a butter slicing and dispensing machine, a plate tiltable on a horizontal axis adjacent one end thereof, means for delivering a block of butter downwardly to said plate, a horizontally reciprocal carriage, a cutter on said carriage arranged to sever a block of butter supported on said plate on advance of said carriage, manually operable means for advancing said carriage, a back bar on said carriage, and a finger carried by the other end of said tiltable plate and extending upwardly for contact with the under side of said carriage when the latter is retracted, said finger being arranged to be cleared by said carriage and to contact and follow said back bar as the carriage is advanced, whereby said plate will tilt to discharge the severed piece of butter.

3. In a butter slicing and dispensing machine, a pivoted tiltable plate for supporting a block of butter and for discharging a severed piece of the butter, a horizontally reciprocable carriage including spaced parallel sections, a knife carried on certain ends of the sections for cutting a slice of butter above the plane of said plate, a bar across the other end of said carriage, a finger extending rearward from the pivot of and upward from said plate to contact the under side of one of said sections when the carriage is retracted, whereby to hold the plate in horizontal butter block supporting position, means for supporting said carriage and plate, and manually operable means for sliding the carriage and knife into and out of butter slicing position, said plate being arranged so that it overbalances and tends to tilt downwardly, said finger being adapted to extend upwardly above the carriage and engage said bar as the carriage is advanced, whereby the finger will follow the carriage and allow the plate to be tilted when the knife severs a slice of butter.

WILLIAM F. COLEMAN.